United States Patent
Takahashi

(10) Patent No.: US 9,793,770 B2
(45) Date of Patent: Oct. 17, 2017

(54) PERMANENT MAGNETS ROTOR FOR ROTATING ELECTRIC MACHINE

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 353 days.

(21) Appl. No.: 14/543,186

(22) Filed: Nov. 17, 2014

(65) Prior Publication Data

US 2015/0137650 A1    May 21, 2015

(30) Foreign Application Priority Data

Nov. 15, 2013  (JP) ................................. 2013-236519

(51) Int. Cl.
*H02K 1/27* (2006.01)
*H02K 1/28* (2006.01)
(Continued)

(52) U.S. Cl.
CPC ............. *H02K 1/2766* (2013.01); *H02K 1/28* (2013.01); *H02K 1/32* (2013.01); *H02K 9/197* (2013.01)

(58) Field of Classification Search
CPC  H02K 1/276; H02K 1/28; H02K 1/32; H02K 9/197
(Continued)

(56) References Cited

U.S. PATENT DOCUMENTS 8,618,709 B2 * 12/2013 Inagaki ................ H02K 1/2766
                                                    310/156.45
2007/0252469 A1 * 11/2007 Nishiura .............. H02K 1/2773
                                                    310/156.56
(Continued)

FOREIGN PATENT DOCUMENTS

JP    2000-316243    11/2000
JP    2004-104962     4/2004
(Continued)

OTHER PUBLICATIONS

Office Action (3 pgs.) dated Nov. 5, 2015 issued in corresponding Japanese Application No. 2013-236519 with an at least partial English language translation (4 pgs.).

*Primary Examiner* — John K Kim
(74) *Attorney, Agent, or Firm* — Nixon & Vanderhye P.C.

(57) ABSTRACT

A rotor includes a rotor core that has magnet-receiving holes in each of which is received a corresponding permanent magnet. The rotor core also has, for each of the magnet-receiving holes, first and second supporting portions. The first supporting portion supports a radially inner end portion of a first magnetic flux barrier-side face of the corresponding permanent magnet. The second supporting portion supports a radially outer end portion of a second magnetic flux barrier-side face of the corresponding permanent magnet. A second magnetic flux barrier-side end portion of a radially outer wall surface of the magnet-receiving hole is planar in shape and parallel to a radially outer side face of the corresponding permanent magnet. A second magnetic flux barrier-side end portion of a radially inner wall surface of the magnet-receiving hole is planar in shape and parallel to a radially inner side face of the corresponding permanent magnet.

3 Claims, 8 Drawing Sheets

(51) Int. Cl.
*H02K 1/32* (2006.01)
*H02K 9/197* (2006.01)

(58) Field of Classification Search
USPC .................. 310/156.53, 156.56, 216.106
IPC ............................. H02K 1/27, 1/28, 1/32, 9/197
See application file for complete search history.

(56) References Cited

U.S. PATENT DOCUMENTS

| | | | |
|---|---|---|---|
| 2008/0007131 A1 | 1/2008 | Cai et al. | |
| 2009/0079287 A1 | 3/2009 | Hattori et al. | |
| 2011/0241468 A1* | 10/2011 | Inagaki | H02K 1/2766 310/156.32 |
| 2012/0139378 A1* | 6/2012 | Endo | H02K 1/2766 310/156.21 |
| 2012/0223607 A1 | 9/2012 | Uchiyama et al. | |
| 2013/0119817 A1* | 5/2013 | Arimatsu | H02K 1/276 310/216.074 |
| 2014/0077653 A1* | 3/2014 | Takahashi | H02K 1/2766 310/156.53 |
| 2014/0091664 A1* | 4/2014 | Aoyama | H02K 1/274 310/156.53 |
| 2015/0137632 A1* | 5/2015 | Takahashi | H02K 1/28 310/54 |
| 2015/0137650 A1* | 5/2015 | Takahashi | H02K 1/2766 310/156.56 |

FOREIGN PATENT DOCUMENTS

| | | |
|---|---|---|
| JP | 2006-311730 | 11/2006 |
| JP | 2009-232525 | 10/2009 |
| JP | 2010-178535 | 8/2010 |
| JP | 2011-211860 | 10/2011 |
| JP | 2012-186889 | 9/2012 |

* cited by examiner

PERMANENT MAGNETS ROTOR FOR ROTATING ELECTRIC MACHINE

CROSS-REFERENCE TO RELATED APPLICATION

This application is based on and claims priority from Japanese Patent Application No. 2013-236519 filed on Nov. 15, 2013, the content of which is hereby incorporated by reference in its entirety into this application.

BACKGROUND

1. Technical Field

The present invention relates to rotors for rotating electric machines that are used in, for example, motor vehicles as electric motors and electric generators.

2. Description of Related Art

There are known IPM (Interior Permanent Magnet) motors that have permanent magnets embedded in a rotor core. The IPM motors can use both reluctance torque and magnetic torque, thereby achieving high efficiency. Therefore, the IPM motors are particularly suitable for use in hybrid and electric vehicles.

An IPM motor generally includes a stator and a rotor that is disposed in radial opposition to the stator. The rotor includes a rotor core and a plurality of permanent magnets. The rotor core has a plurality of pairs of magnet-receiving holes formed therein. Each pair of the magnet-receiving holes is arranged in a substantially V-shape that opens toward the stator side. Each of the permanent magnets is received in a corresponding one of the magnet-receiving holes of the rotor core. Further, for each pair of the magnet-receiving holes, the two corresponding permanent magnets which are respectively received in the two magnet-receiving holes of the pair are arranged so as to together form one magnetic pole of the rotor. In addition, for each pair of the magnet-receiving holes, there is formed a corresponding center bridge that extends in a radial direction of the rotor core between the two magnet-receiving holes of the pair to separate them from each other.

Further, to reduce magnetic flux leakage through the corresponding center bridge, there is disclosed, for example in Japanese Patent Application Publication No. JP2006311730A (to be simply referred to as Patent Document 1 hereinafter), a technique of suitably designing magnetic flux barriers (or magnetic voids) at ends of the permanent magnets. More specifically, according to the technique, for each of the permanent magnets, there is provided a first magnetic flux barrier at a non-magnetic pole center-side end of the permanent magnet and a second magnetic flux barrier at a magnetic pole center-side end of the permanent magnet.

Moreover, according to the disclosure of Patent Document 1, each of the permanent magnets is arranged in the corresponding one of the magnet-receiving holes of the rotor core so that there is formed a gap between a radially outer side face of the permanent magnet and a radially outer wall surface of the corresponding magnet-receiving hole. The gap has a constant width at a circumferential central portion of the permanent magnet. Further, the gap has a greater width at circumferential end portions of the permanent magnet than at the circumferential central portion. Consequently, with the above arrangement of the permanent magnets in the corresponding magnet-receiving holes of the rotor core, it is possible to prevent local stress concentration from occurring in the rotor core.

In addition, according to the disclosure of Patent Document 1, for each of the permanent magnets, there are provided in the rotor core a pair of supporting portions that respectively support radially inner end portions of the first magnetic flux barrier-side and second magnetic flux barrier-side faces of the permanent magnet.

On the other hand, Japanese Patent Application Publication No. JP2011211860A (to be simply referred to as Patent Document 2 hereinafter) discloses a technique of providing relatively large second magnetic flux barriers each of which extends radially inward from a magnetic pole center-side end of a corresponding one of the magnet-receiving holes of the rotor core, thereby reducing magnetic flux leakage radially inward.

Moreover, Patent Document 2 also discloses that in the rotor core, there are provided, for each of the permanent magnets, a pair of supporting portions that respectively support radially inner end portions of the first magnetic flux barrier-side and second magnetic flux barrier-side faces of the permanent magnet. In addition, in a root part of the supporting portion that supports the radially inner end portion of the second magnetic flux barrier-side face of the permanent magnet, there is formed a void space with a predetermined length, so as to improve the operating efficiency of the rotating electric machine.

However, in operation of an IPM motor as described above, the permanent magnets generate heat with rotation of the rotor, causing the temperature of the rotor core to increase. Accordingly, with repetition of start and stop of the operation of the IPM motor, thermal stress will be repeatedly induced in the rotor core.

In particular, according to Patent Documents 1 and 2, for each of the permanent magnets received in the corresponding magnet-receiving holes of the rotor core, the first magnetic flux barrier-side and second magnetic flux barrier-side faces of the permanent magnet are respectively supported by the pair of supporting portions of the rotor core. Consequently, an excessive load due to thermal stress will be imposed on the pair of supporting portions, thereby making it difficult to ensure high strength of the rotor core.

Moreover, according to Patent Document 1, for each of the permanent magnets, the gap formed between the radially outer side face of the permanent magnet and the radially outer wall surface of the corresponding magnet-receiving hole of the rotor core has a greater width at the circumferential end portions of the permanent magnet than at the circumferential central portion. Consequently, it is particularly easy for demagnetization (or reduction of magnetic flux) to occur at both a magnetic flux loop that is created by magnetic flux leaking through the corresponding center bridge and completed within the rotor and a magnetic flux loop that is created by excitation by the stator of the rotating electric machine and passes between adjacent magnetic poles of the rotor.

On the other hand, according to Patent Document 2, for each of the permanent magnets, there is formed the void space in the root part of the supporting portion that supports the radially inner end portion of the second magnetic flux barrier-side face of the permanent magnet. Consequently, it is particularly easy for demagnetization to occur around a corner portion of the permanent magnet between the second magnetic flux barrier-side face and the radially inner side face of the permanent magnet.

SUMMARY

According to one exemplary embodiment, there is provided a first rotor for a rotating electric machine. The first rotor includes a hollow cylindrical rotor core and a plurality of permanent magnets. The rotor core has a plurality of pairs of magnet-receiving holes formed therein. Each pair of the magnet-receiving holes is arranged in a substantially V-shape that opens toward a radially outer periphery of the rotor core. Each of the permanent magnets is received in a corresponding one of the magnet-receiving holes of the rotor core. For each pair of the magnet-receiving holes of the rotor core, the two corresponding permanent magnets which are respectively received in the two magnet-receiving holes of the pair are arranged so as to together form one magnetic pole of the first rotor. The rotor core further has, for each of the magnet-receiving holes, first and second magnetic flux barriers and first and second supporting portions. The first magnetic flux barrier extends from a non-magnetic pole center-side end of the magnet-receiving hole circumferentially outward. The second magnetic flux barrier extends from a magnetic pole center-side end of the magnet-receiving hole radially inward. The first supporting portion supports a radially inner end portion of a first magnetic flux barrier-side face of the corresponding permanent magnet received in the magnet-receiving hole. The second supporting portion supports a radially outer end portion of a second magnetic flux barrier-side face of the corresponding permanent magnet. For each of the magnet-receiving holes, a second magnetic flux barrier-side end portion of a radially outer wall surface of the magnet-receiving hole is planar in shape and parallel to a radially outer side face of the corresponding permanent magnet received in the magnet-receiving hole; a second magnetic flux barrier-side end portion of a radially inner wall surface of the magnet-receiving hole is planar in shape and parallel to a radially inner side face of the corresponding permanent magnet.

With the above structure of the first rotor, the first and second supporting portions respectively support two corner portions of the corresponding permanent magnet which are diagonally opposite to each other. Consequently, the corresponding permanent magnet is held between the first and second supporting portions in the circumferential direction of the rotor core. As a result, in operation, it is possible to disperse thermal stresses, which are repeatedly induced respectively in the first and second supporting portions by heat generated by the corresponding permanent magnet, respectively toward opposite sides in the circumferential direction, thereby ensuring high strength of the rotor core.

Moreover, with the above structure of the first rotor, it is possible to minimize both the gap between the second magnetic flux barrier-side end portion of the radially outer wall surface of the magnet-receiving hole and the radially outer side face of the corresponding permanent magnet and the gap between the second magnetic flux barrier-side end portion of the radially inner wall surface of the magnet-receiving hole and the radially inner side face of the corresponding permanent magnet. Consequently, it is possible to prevent large magnetic voids from being formed on a magnetic flux loop that is created by magnetic flux leaking through a corresponding center bridge and completed within the first rotor, thereby improving the demagnetization-suppressing performance of the first rotor. Here, the corresponding center bridge is formed in the rotor core on as to radially extend between the magnet-receiving hole and the mating magnet-receiving hole which together constitute one pair of the magnet-receiving holes of the rotor core.

According to another exemplary embodiment, there is provided a second rotor for a rotating electric machine. The second rotor includes a hollow cylindrical rotor core and a plurality of permanent magnets. The rotor core has a plurality of pairs of magnet-receiving holes formed therein. Each pair of the magnet-receiving holes is arranged in a substantially V-shape that opens toward a radially outer periphery of the rotor core. Each of the permanent magnets is received in a corresponding one of the magnet-receiving holes of the rotor core. For each pair of the magnet-receiving holes of the rotor core, the two corresponding permanent magnets which are respectively received in the two magnet-receiving holes of the pair are arranged so as to together form one magnetic pole of the second rotor. The rotor core further has, for each of the magnet-receiving holes, first and second magnetic flux barriers. The first magnetic flux barrier extends from a non-magnetic pole center-side end of the magnet-receiving hole circumferentially outward. The second magnetic flux barrier extends from a magnetic pole center-side end of the magnet-receiving hole radially inward. The rotor core further has, for each pair of the magnet-receiving holes, a corresponding center bridge that radially extends between the two second magnetic flux barriers extending respectively from the two magnet-receiving holes of the pair so as to separate the two second magnetic flux barriers from each other. The rotor core further has, for each of the magnet-receiving holes, first and second supporting portions. The first supporting portion supports a radially inner end portion of a first magnetic flux barrier-side face of the corresponding permanent magnet received in the magnet-receiving hole. The second supporting portion protrudes from the corresponding center bridge to support a second magnetic flux barrier-side face of the corresponding permanent magnet. For each of the magnet-receiving holes, a second magnetic flux barrier-side end portion of a radially outer wall surface of the magnet-receiving hole is planar in shape and parallel to a radially outer side face of the corresponding permanent magnet received in the magnet-receiving hole; a second magnetic flux barrier-side end portion of a radially inner wall surface of the magnet-receiving hole is planar in shape and parallel to a radially inner side face of the corresponding permanent magnet.

With the above structure of the second rotor, the corresponding permanent magnet is held between the first and second supporting portions in the circumferential direction of the rotor core. Consequently, in operation, it is possible to disperse thermal stresses, which are repeatedly induced respectively in the first and second supporting portions by heat generated by the corresponding permanent magnet, respectively toward opposite sides in the circumferential direction, thereby ensuring high strength of the rotor core.

Moreover, with the above structure of the second rotor, it is possible to minimize both the gap between the second magnetic flux barrier-side end portion of the radially outer wall surface of the magnet-receiving hole and the radially outer side face of the corresponding permanent magnet and the gap between the second magnetic flux barrier-side end portion of the radially inner wall surface of the magnet-receiving hole and the radially inner side face of the corresponding permanent magnet. Consequently, it is possible to prevent large magnetic voids from being formed on a magnetic flux loop that is created by magnetic flux leaking through the corresponding center bridge and completed within the second rotor, thereby improving the demagnetization-suppressing performance of the second rotor.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
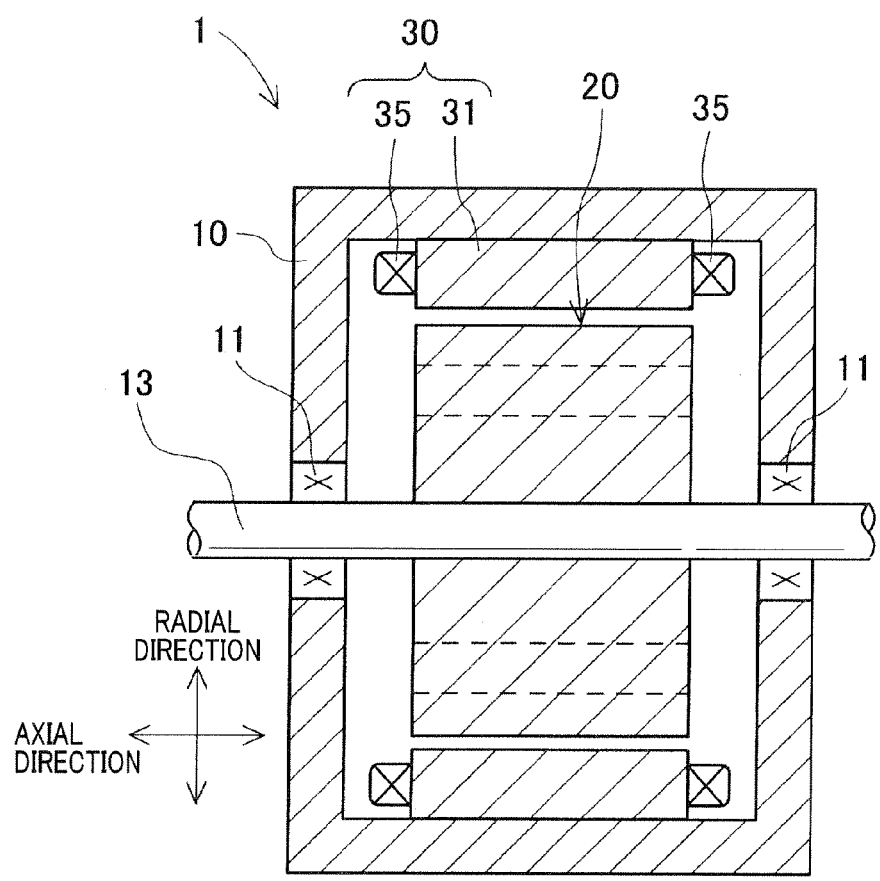
FIG. 1 is a schematic cross-sectional view of a rotating electric machine which includes a rotor according to a first embodiment.

Exemplary embodiments will be described hereinafter with reference to FIGS. 1-8. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotating electric machine 1 which includes a rotor 20 according to the first embodiment.

In the present embodiment, the rotating electric machine 1 is configured as an inner rotor-type electric motor for use in, for example, a motor vehicle. As shown in FIG. 1, the rotating electric machine 1 further includes, in addition to the rotor 20, a housing 10, a rotating shaft 13 and a stator 30.

The housing 10 has a substantially hollow cylindrical shape with both ends closed. The rotating shaft 13 has its end portions respectively rotatably supported by axial end walls of the housing 10 via bearings 11. On the outer periphery of a central portion of the rotating shaft 13 which is received in the housing 10, there is fixedly fitted the rotor 20 so as to be rotatable together with the rotating shaft 13. The structure of the rotor 20 will be described in detail later.

The stator 30 includes an annular stator core 31 and a stator coil 35. The stator core 31 has a plurality of slots (not shown in the figures) formed therein; the slots are spaced from one another in the circumferential direction of the stator core 31 at predetermined intervals. The stator coil 35 is mounted on the stator core 31 so as to be received in the slots of the stator core 31. Moreover, the radially outer surface of the stator core 31 is fixedly fitted to the inner surface of an axially central portion of a circumferential wall of the housing 10. Consequently, the stator 30 is fixed, in the housing 10, radially outside the rotor 20 so as to face the rotor 20 with a predetermined air gap formed therebetween.

Next, the structure of the rotor 20 according to the present embodiment will be described in detail with reference to FIGS. 2-4.

Figure 2:
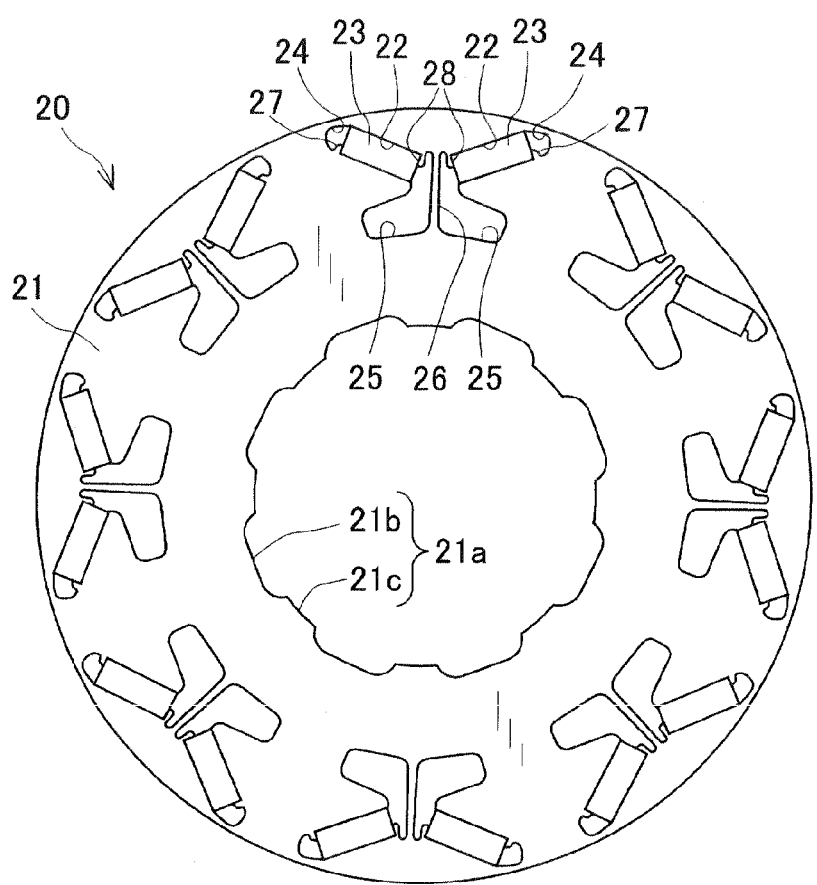
FIG. 2 is an axial view of the rotor according to the first embodiment.

As shown in FIG. 2, the rotor 20 includes a hollow cylindrical rotor core 21 and a plurality of permanent magnets 23. The rotor core 21 has a center hole 21a and a plurality of pairs of magnet-receiving holes 22. In the center hole 21a, there is press-fitted the rotating shaft 13 (see FIG. 1). The pairs of magnet-receiving holes 22 are formed in the vicinity of a radially outer periphery of the rotor core 21 so as to be spaced from one another in the circumferential direction of the rotor core 21 at equal intervals. The permanent magnets 23 are respectively received in the magnet-receiving holes 22 of the rotor core 21 on as to form a plurality of magnetic poles on the radially outer periphery of the rotor core 21. The polarities of the magnetic poles alternate between north and south in the circumferential direction of the rotor core 21.

Figure 3:
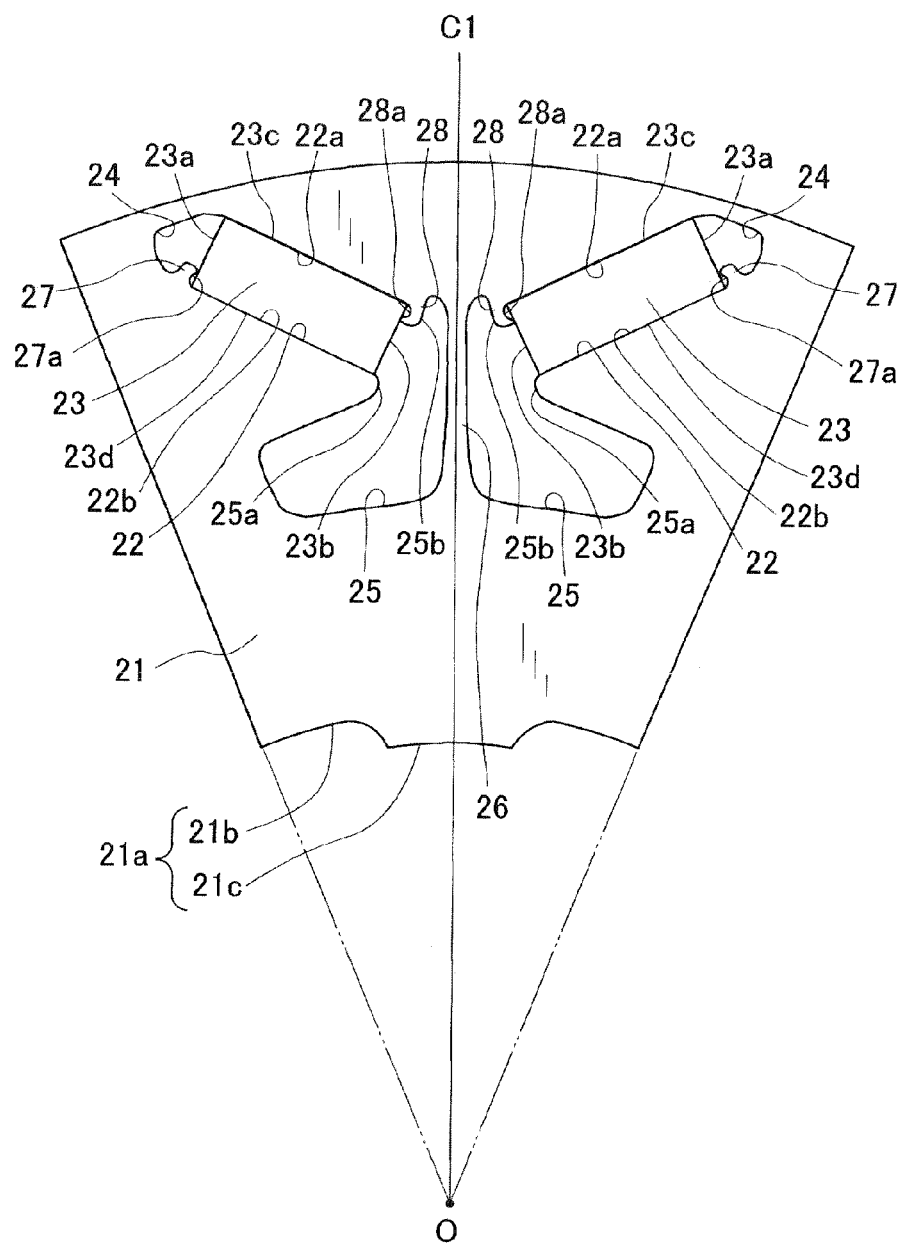
FIG. 3 is an axial view of a portion of the rotor according to the first embodiment, the portion corresponding to one of magnetic poles that are formed in the rotor.

More specifically, in the present embodiment, the rotor core 21 is formed by laminating a plurality of magnetic steel sheets in the axial direction (i.e., the direction of a longitudinal axis O of the rotor core 21 shown in FIG. 3); each of the magnetic steel sheets is annular-shaped to have a center hole in which the rotating shaft 13 is to be press-fitted. Moreover, in a radially inner surface of the rotor core 21 which defines the center hole 21a, there are formed a plurality of non-contacting recesses (or valleys) 21b and a plurality of contacting protrusions (or ridges) 21c. Each of the non-contacting recesses 21b extends in the axial direction of the rotor core 21 and is recessed radially outward so as not to be in contact with the rotating shaft 13. Each of the contacting protrusions 21c extends in the axial direction of the rotor core 21 and protrudes radially inward so as to be in pressed contact with the rotating shaft 13. The non-contacting recesses 21b are alternately arranged with the contacting protrusions 21c in the circumferential direction of the rotor core 21.

Each of the magnet-receiving holes 22 is formed so as to penetrate the rotor core 21 in the axial direction and have a substantially rectangular cross section perpendicular to the axial direction. Further, each pair of the magnet-receiving holes 22 is arranged in a substantially V-shape that opens toward the radially outer periphery of the rotor core 21 (i.e., toward the stator 30 side). In addition, in the present embodiment, there are formed a total of eight pairs of the magnet-receiving holes 22 (i.e., a total of sixteen magnet-receiving holes 22) in the rotor core 21.

Each of the permanent magnets 23 is embedded in a corresponding one of the magnet-receiving holes 22 of the rotor core 21. The permanent magnets 23 have a slightly smaller rectangular cross section perpendicular to the axial direction of the rotor core 21 than the corresponding magnet-receiving holes 22 of the rotor core 21. Moreover, for each pair of the magnet-receiving holes 22 of the rotor core 21, the two permanent magnets 23 which are respectively received in the two magnet-receiving holes 22 of the pair are arranged so that the polarities (north or south) of the two permanent magnets 23 are the same on the radially outer periphery of the rotor core 21. Consequently, the two permanent magnets 23 together form one magnetic pole on the radially outer periphery of the rotor core 21. Accordingly, in the present embodiment, there are formed a total of eight magnetic poles (i.e., four north poles and four south poles) on the radially outer periphery of the rotor core 21. Further, as described previously, the polarities of the eight magnetic poles alternate between north and south in the circumferential direction of the rotor core 21. In addition, each of the permanent magnets 23 is fixed in the corresponding magnet-receiving hole 22 of the rotor core 21 by an adhesive (not shown in the figures) filled in the corresponding magnet-receiving hole 22. The adhesive is made of a nonmagnetic material.

Furthermore, as shown in FIG. 3, when viewed along the axial direction of the rotor core 21, for each pair of the magnet-receiving holes 22 of the rotor core 21, the two permanent magnets 23 which are respectively received in the two magnet-receiving holes 22 of the pair are symmetrically arranged and extend obliquely with respect to a magnetic pole centerline C1; the magnetic pole centerline C1 extends in a radial direction of the rotor core 21 so as to circumferentially bisect the magnetic pole formed by the two permanent magnets 23. Consequently, the two permanent magnets 23 also together form a substantially V-shape that opens radially outward (i.e., toward the radially outer periphery of the rotor core 21).

Moreover, for each of the magnet-receiving holes 22 of the rotor core 21, there are formed in the rotor core 21 first and second magnetic flux barriers (or magnetic voids) 24 and 25 respectively on the non-magnetic pole center side and magnetic pole center side of the magnet-receiving hole 22. The first magnetic flux barrier 24 extends from a non-magnetic pole center-side end of the magnet-receiving hole 22 circumferentially outward (i.e., away from the magnetic pole centerline C1 in the circumferential direction of the rotor core 21). The second magnetic flux barrier 25 extends from a magnetic pole center-side end of the magnet-receiving hole 22 radially inward (i.e., toward the longitudinal axis O of the rotor core 21).

Furthermore, for each pair of the magnet-receiving holes 22 of the rotor core 21, there is formed in the rotor core 21 a corresponding center bridge 26 that radially extends between the two second magnetic flux barriers 25 respectively extending from the magnetic pole center-side ends of the two magnet-receiving holes 22 of the pair. The corresponding center bridge 26 is provided for causing magnetic flux saturation and thereby impeding formation of a magnetic circuit between the two second magnetic flux barriers 25.

Figure 4:
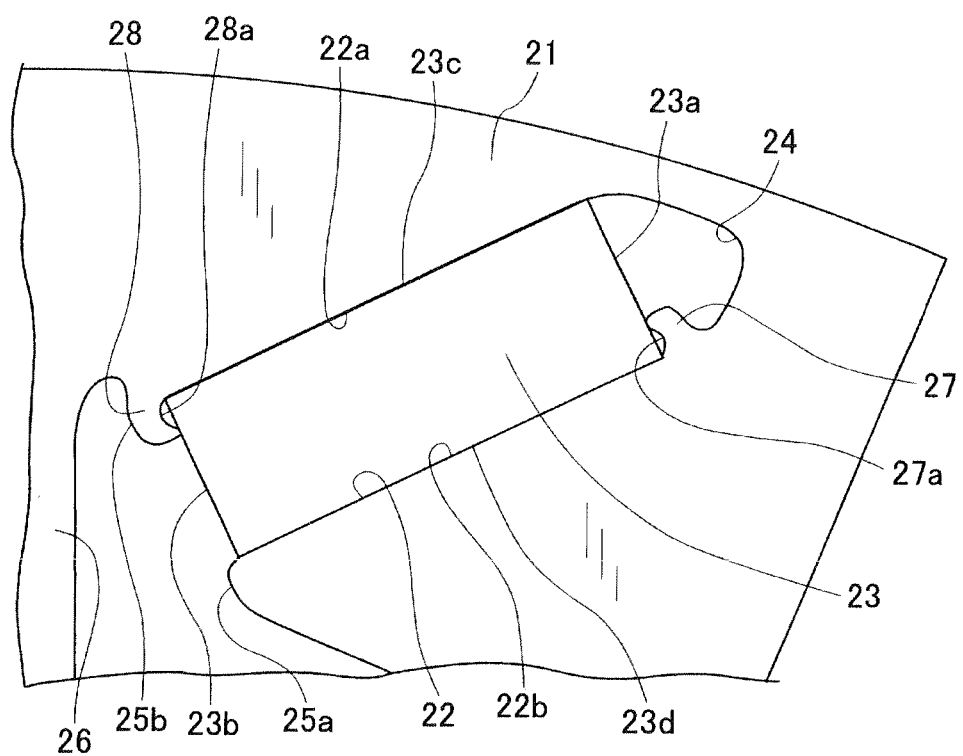
FIG. 4 is an enlarged view of part of FIG. 3.

Moreover, as shown in FIGS. 3-4, for each of the magnet-receiving holes 22 of the rotor core 21, there are also formed in the rotor core 21 both first and second supporting portions 27 and 28 that support the corresponding permanent magnet 23 received in the magnet-receiving hole 22.

More specifically, the first supporting portion 27 is formed at a radially inner end (i.e., a longitudinal axis O-side end) of the first magnetic flux barrier 24 so as to support a radially inner end portion of a first magnetic flux barrier-side face 23a of the corresponding permanent magnet 23. Moreover, in a surface of the first supporting portion 27 which faces the corresponding permanent magnet 23, there is formed a recess 27a that extends in the axial direction of the rotor core 21 and is recessed in a direction away from the corresponding permanent magnet 23. Consequently, with the recess 27a, it is possible to reduce magnetic flux flowing through the first supporting portion 27, thereby suppressing demagnetization.

The second supporting portion 28 is formed at a radially outer end (i.e., a non-longitudinal axis O-side end) of the second magnetic flux barrier 25 so as to support a radially outer end portion of a second magnetic flux barrier-side face 23b of the corresponding permanent magnet 23. Moreover, in a surface of the second supporting portion 28 which faces the corresponding permanent magnet 23, there is formed a recess 28a that extends in the axial direction of the rotor core 21 and is recessed in a direction away from the corresponding permanent magnet 23. Consequently, with the recess 28a, it is possible to reduce magnetic flux flowing through the second supporting portion 28, thereby suppressing demagnetization.

That is, in the present embodiment, the first and second supporting portions 27 and 28 are formed so as to respectively support two corner portions of the corresponding permanent magnet 23 which are diagonally opposite to each other (i.e., opposite to each other on a diagonal of the rectangular cross section of the corresponding permanent magnet 23). Consequently, the corresponding permanent magnet 23 is held between the first and second supporting portions 27 and 28 in the circumferential direction of the rotor core 21.

Moreover, for each of the magnet-receiving holes 22 of the rotor core 21, a second magnetic flux barrier-side end portion of a radially outer wall surface 22a of the magnet-receiving hole 22 is planar in shape and parallel to a radially outer side face 23c of the corresponding permanent magnet 23 which is also planar in shape. Consequently, it becomes possible to minimize a gap between the second magnetic flux barrier-side end portion of the radially outer wall surface 22a of the magnet-receiving hole 22 and the radially outer side face 23c of the corresponding permanent magnet 23. Similarly, a second magnetic flux barrier-side end portion of a radially inner wall surface 22b of the magnet-receiving hole 22 is planar in shape and parallel to a radially inner side face 23d of the corresponding permanent magnet 23 which is also planar in shape. Consequently, it becomes possible to minimize a gap between the second magnetic flux barrier-side end portion of the radially inner wall surface 22b of the magnet-receiving hole 22 and the radially inner side face 23d of the corresponding permanent magnet 23.

Furthermore, as shown in FIG. 3, for each of the magnet-receiving holes 22 of the rotor core 21, there are formed in the rotor core 21 a pair of second magnetic flux barrier part defining surfaces 25a and 25b that each define a part of the second magnetic flux barrier 25 and are respectively adjacent to the radially inner and outer ends of the second magnetic flux barrier-side face 23b of the corresponding permanent magnet 23. Further, both the second magnetic flux barrier part defining surfaces 25a and 25b protrude from the second magnetic flux barrier-side face 23b of the corresponding permanent magnet 23 toward the magnetic pole centerline C1 side. Here, corner portions between the second magnetic flux barrier part defining surfaces 25a and 25b and the wall surfaces of the magnet-receiving hole 22 are used as references for determining whether the second magnetic flux barrier part defining surfaces 25a and 25b protrude from the second magnetic flux barrier-side face 23b toward the magnetic pole centerline C1 side.

More specifically, in the present embodiment, the second magnetic flux barrier part defining surface 25a, which is adjacent to the radially inner end of the second magnetic flux barrier-side face 23b of the corresponding permanent magnet 23, protrudes by about 0.5 mm from the second magnetic flux barrier-side face 23b of the corresponding permanent magnet 23 toward the magnetic pole centerline C1 side. The second magnetic flux barrier part defining surface 25b, which is adjacent to the radially outer end of the second magnetic flux barrier-side face 23b of the corresponding permanent magnet 23, constitutes a magnetic pole centerline C1-side surface of the second supporting portion 28. The protruding amount of the second magnetic flux barrier part defining surface 25b toward the magnetic pole centerline C1 side is equal to the width of the second supporting portion 28. With the above configuration, it is possible to increase the permeance of a magnetic circuit formed in the rotor 20.

After having described the structure of the rotor 20 according to the present embodiment, advantages thereof will be described hereinafter.

In the present embodiment, the rotor 20 includes the hollow cylindrical rotor core 21 and the permanent magnets 23. The rotor core 21 has the pairs of the magnet-receiving holes 22 formed therein. Each pair of the magnet-receiving holes 22 is arranged in the substantially V-shape that opens toward the radially outer periphery of the rotor core 21. Each of the permanent magnets 23 is received in the corresponding one of the magnet-receiving holes 22 of the rotor core 21. For each pair of the magnet-receiving holes 22 of the rotor core 21, the two corresponding permanent magnets 23 which are respectively received in the two magnet-receiving holes 22 of the pair are arranged so as to together form one magnetic pole of the rotor 20. The rotor core 21 further has, for each of the magnet-receiving holes 22, the first and second magnetic flux barriers 24 and 25 and the first and second supporting portions 27 and 28. The first magnetic flux barrier 24 extends from the non-magnetic pole center-side end of the magnet-receiving hole 22 circumferentially outward. The second magnetic flux barrier 25 extends from the magnetic pole center-side end of the magnet-receiving hole 22 radially inward. The first supporting portion 27 supports the radially inner end portion of the first magnetic flux barrier-side face 23a of the corresponding permanent magnet 23 received in the magnet-receiving hole 22. The second supporting portion 28 supports the radially outer end portion of the second magnetic flux barrier-side face 23b of the corresponding permanent magnet 23.

With the above structure, the first and second supporting portions 27 and 28 respectively support two corner portions of the corresponding permanent magnet 23 which are diagonally opposite to each other. Consequently, the corresponding permanent magnet 23 is held between the first and second supporting portions 27 and 28 in the circumferential direction of the rotor core 21. As a result, in operation, it is possible to disperse thermal stresses, which are repeatedly induced respectively in the first and second supporting portions 27 and 28 by heat generated by the corresponding permanent magnet 23, respectively toward opposite sides in the circumferential direction, thereby ensuring high strength of the rotor core 21.

Further, in the present embodiment, for each of the magnet-receiving holes 22, the second magnetic flux barrier-side end portion of the radially outer wall surface 22a of the magnet-receiving hole 22 is planar in shape and parallel to the radially outer side face 23c of the corresponding permanent magnet 23 received in the magnet-receiving hole 22. The second magnetic flux barrier-side end portion of the radially inner wall surface 22b of the magnet-receiving hole 22 is planar in shape and parallel to the radially inner side face 23d of the corresponding permanent magnet 23.

With the above configuration, it is possible to minimize both the gap between the second magnetic flux barrier-side end portion of the radially outer wall surface 22a of the magnet-receiving hole 22 and the radially outer side face 23c of the corresponding permanent magnet 23 and the gap between the second magnetic flux barrier-side end portion of the radially inner wall surface 22b of the magnet-receiving hole 22 and the radially inner side face 23d of the corresponding permanent magnet 23. Consequently, it is possible to prevent large magnetic voids from being formed on a magnetic flux loop that is created by magnetic flux leaking through the corresponding center bridge 26 and completed within the rotor 20, thereby improving the demagnetization-suppressing performance of the rotor 20.

Moreover, in the present embodiment, in the surface of the first supporting portion 27 which faces the corresponding permanent magnet 23, there is formed the recess 27a that extends in the axial direction of the rotor core 21 and is recessed in the direction away from the corresponding permanent magnet 23. Similarly, in the surface of the second supporting portion 28 which faces the corresponding permanent magnet 23, there is formed the recess 28a that extends in the axial direction of the rotor core 21 and is recessed in the direction away from the corresponding permanent magnet 23.

With the above recesses 27a and 28a, it is possible to reduce magnetic fluxes flowing through the first and second supporting portions 27 and 28, thereby suppressing demagnetization.

Furthermore, in the present embodiment, for each of the magnet-receiving holes 22 of the rotor core 21, there are formed in the rotor core 21 the pair of second magnetic flux barrier part defining surfaces 25a and 25b that each define a part of the second magnetic flux barrier 25 and are respectively adjacent to the radially inner and outer ends of the second magnetic flux barrier-side face 23b of the corresponding permanent magnet 23 received in the magnet-receiving hole 22. Further, at least one (more particularly, both in the present embodiment) of the second magnetic flux barrier part defining surfaces 25a and 25b protrudes from the second magnetic flux barrier-side face 23b of the corresponding permanent magnet 23 toward the magnetic pole centerline C1 side.

With the above configuration, it is possible to increase the permeance of the magnetic circuit formed in the rotor 20.

Second Embodiment

This embodiment illustrates a rotor 20A which has a similar structure to the rotor 20 according to the first embodiment; accordingly, only the differences therebetween will be described hereinafter.

In the first embodiment, as described previously, for each of the magnet-receiving holes 22 of the rotor core 21, there are formed in the rotor core 21 both the first and second supporting portions 27 and 28 that support the corresponding permanent magnet 23 received in the magnet-receiving hole 22. More specifically, the first supporting portion 27 is formed at the radially inner end of the first magnetic flux barrier 24 so as to support the radially inner end portion of the first magnetic flux barrier-side face 23a of the corresponding permanent magnet 23. The second supporting portion 28 is formed at the radially outer end of the second magnetic flux barrier 25 so as to support the radially outer end portion of the second magnetic flux barrier-side face 23b of the corresponding permanent magnet 23 (see FIGS. 3-4).

Figure 5:
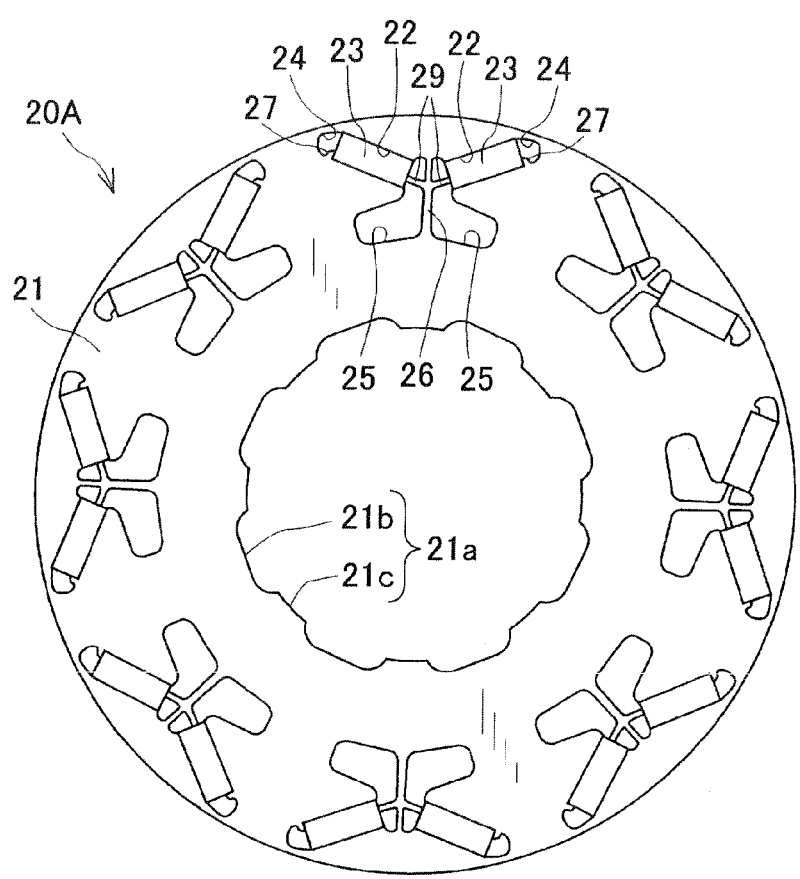
FIG. 5 is an axial view of a rotor according to a second embodiment.
Figure 6:
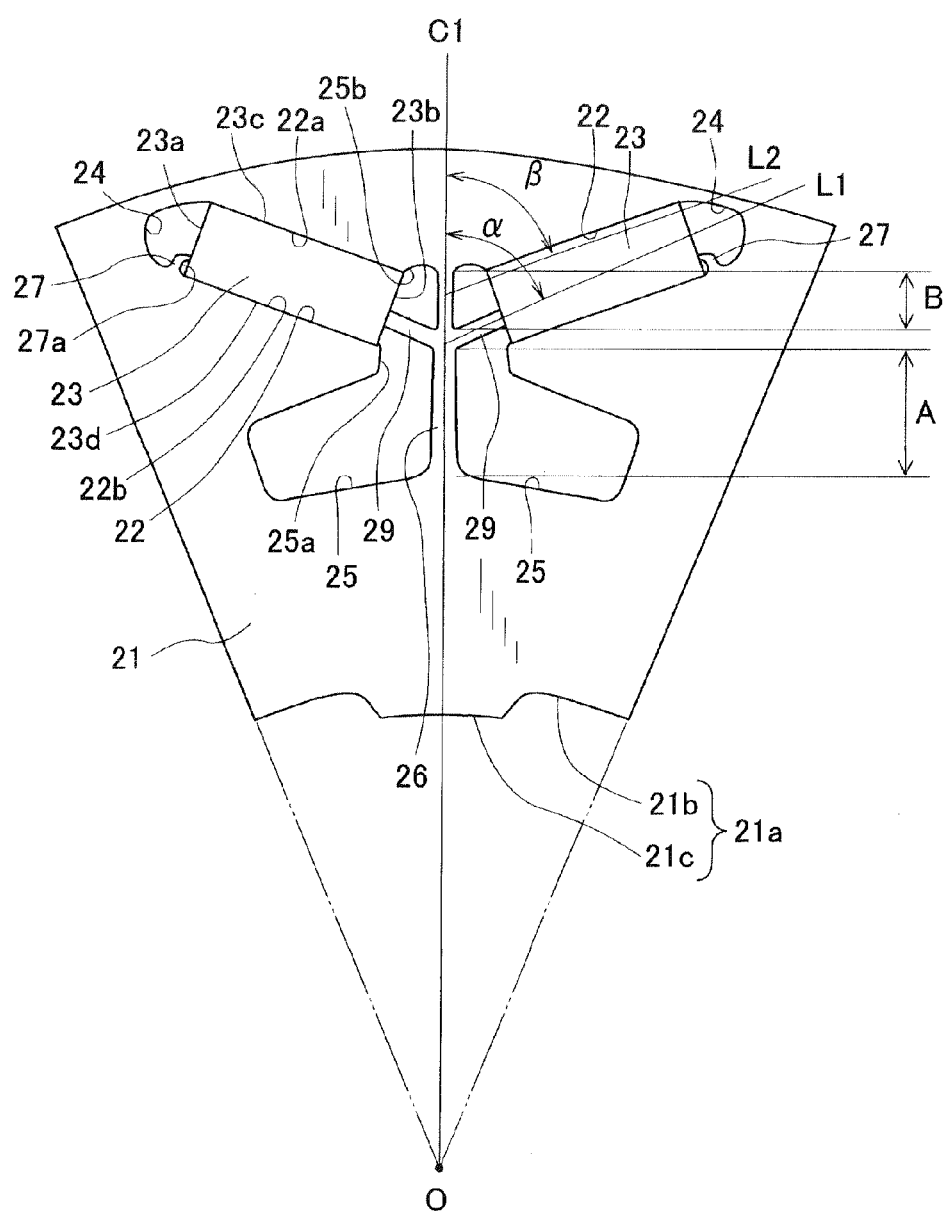
FIG. 6 is an axial view of a portion of the rotor according to the second embodiment, the portion corresponding to one of magnetic poles that are formed in the rotor.

In comparison, in the present embodiment, as shown in FIGS. 5-6, for each of the magnet-receiving holes 22 of the rotor core 21, there are formed in the rotor core 21 both first and second supporting portions 27 and 29 that support the corresponding permanent magnet 23 received in the magnet-receiving hole 22. The first supporting portion 27 in the present embodiment is identical to that in the first embodiment. Accordingly, description of the first supporting portion 27 is not repeated hereinafter.

In the present embodiment, the second supporting portion 29 protrudes from the corresponding center bridge 26 toward the corresponding permanent magnet 23 received in the magnet-receiving hole 22, so as to have its distal end abutting the second magnetic flux barrier-side face 23b of the corresponding permanent magnet 23.

More specifically, in the present embodiment, the second supporting portion 29 is formed so that the distal end of the second supporting portion 29 abuts a portion of the second magnetic flux barrier-side face 23b of the corresponding permanent magnet 23 which is away from both the radially inner and outer ends of the second magnetic flux barrier-side face 23b and closer to the radially inner end than the radially outer end of the second magnetic flux harrier-side face 23b. With the above formation, the second magnetic flux harrier 25 is partitioned by the second supporting portion 29 into a radially inner section and a radially outer section.

Moreover, in the present embodiment, as shown in FIG. 6, the protruding position of the second supporting portion 29 from the corresponding center bridge 26 is set so as to satisfy the following dimensional relationship: A>B, where A is the distance from the radially inner end of the corresponding center bridge 26 to the second supporting portion 29 and B is the distance from the radially outer end of the corresponding center bridge 26 to the second supporting portion 29. Satisfying the above relationship, the radially inner section of the second magnetic flux barrier 25 is larger than the radially outer section, thereby enabling the second magnetic flux 25 to function better as a magnetic void space.

Furthermore, in the present embodiment, as shown in FIG. 6, an angle $\alpha$ formed between a centerline L1 of the second supporting portion 29 and the magnetic pole centerline C1 on the radially outside of the centerline L1 is an acute angle. Moreover, the angle $\alpha$ is less than an angle $\beta$ formed between an imaginary line L2, which is perpendicular to the magnetization direction of the corresponding permanent magnet 23, and the magnetic pole centerline C1 on the radially outside of the imaginary line L2. Setting the angle $\alpha$ as above, it is possible to increase the protruding length of the second supporting portion 29 from the corresponding center bridge 26, thereby increasing the length of a magnetic saturation loop that passes through the corresponding permanent magnet 23, the second supporting portion 29 and the corresponding center bridge 26.

Moreover, in the present embodiment, the corner portion between a second magnetic flux barrier part defining surface 25a and the radially inner wall surface 22b of the magnet-receiving hole 22 protrudes from the second magnetic flux barrier-side face 23b of the corresponding permanent magnet 23 toward the magnetic pole centerline C1 side; the second magnetic flux barrier part defining surface 25a defines a part of the second magnetic flux barrier 25 and is adjacent to the radially inner end of the second magnetic flux barrier-side face 23b of the corresponding permanent magnet 23. However, the corner portion between a second magnetic flux barrier part defining surface 25b and the radially outer wall surface 22a of the magnet-receiving hole 22 does not protrude from the second magnetic flux barrier-side face 23b of the corresponding permanent magnet 23 toward the magnetic pole centerline C1 side; the second magnetic flux barrier part defining surface 25b defines a part of the second magnetic flux barrier 25 and is adjacent to the radially outer end of the second magnetic flux barrier-side face 23b of the corresponding permanent magnet 23.

Furthermore, as in the first embodiment, the second magnetic flux barrier-side end portion of the radially outer wall surface 22a of the magnet-receiving hole 22 is planar in shape and parallel to the radially outer side face 23c of the corresponding permanent magnet 23 received in the magnet-receiving hole 22. The second magnetic flux barrier-side end portion of the radially inner wall surface 22b of the magnet-receiving hole 22 is planar in shape and parallel to the radially inner side face 23d of the corresponding permanent magnet 23.

Figure 7:
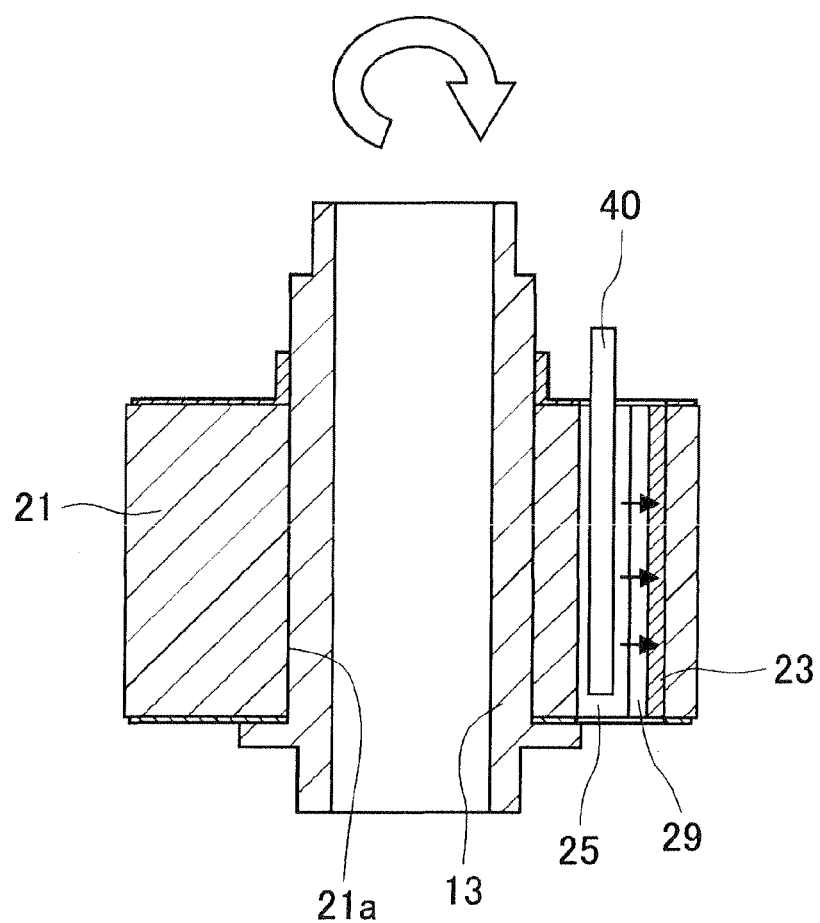
FIG. 7 is a schematic view illustrating a method of fixing each of permanent magnets in a corresponding one of magnet-receiving holes formed in a rotor core of the rotor according to the second embodiment.

Next, a method of fixing each of the permanent magnets 23 in the corresponding one of the magnet-receiving holes 22 of the rotor core 21 according to the present embodiment will be described with reference to FIG. 7.

First, each of the permanent magnets 23 is inserted in the corresponding one of the magnet-receiving holes 22 of the rotor core 21. Then, as shown in FIG. 7, the rotor core 21 is rotated together with the rotating shaft 21 that is press-fitted in the center hole 21a of the rotor core 21. With the rotation of the rotor core 21, each of the permanent magnets 23 is pressed by the centrifugal force against the radially outer wall surface 22a of the corresponding magnet-receiving hole 22 of the rotor core 21. Further, with each of the permanent magnets 23 kept in such a pressed state, a liquid adhesive is supplied into the second magnetic flux barrier 25 adjacent to the corresponding magnet-receiving hole 22. Then, the supplied adhesive is guided by the second supporting portion 29 to flow into the corresponding magnet-receiving hole 22, and is diffused by the centrifugal force to occupy all the gaps between the side faces of the permanent magnet 23 and the wall surfaces of the corresponding magnet-receiving hole 22. Thereafter, the liquid adhesive is set (or solidified) in the corresponding magnet-receiving hole 22, thereby firmly fixing the permanent magnet 23 to the wall surfaces of the corresponding magnet-receiving hole 22.

The above-described rotor 20A according to the present embodiment has the following advantages.

In the present embodiment, the rotor 20A includes the hollow rotor core 21 and the permanent magnets 23. The rotor core 21 has the pairs of the magnet-receiving holes 22 formed therein. Each pair of the magnet-receiving holes 22 is arranged in the substantially V-shape that opens toward the radially outer periphery of the rotor core 21. Each of the permanent magnets 23 is received in the corresponding one of the magnet-receiving holes 22 of the rotor core 21. For each pair of the magnet-receiving holes 22 of the rotor core 21, the two corresponding permanent magnets 23 which are respectively received in the two magnet-receiving holes 22 of the pair are arranged so as to together form one magnetic pole of the rotor 20A. The rotor core 21 further has, for each of the magnet-receiving holes 22, the first and second magnetic flux barriers 24 and 25. The first magnetic flux barrier 24 extends from the non-magnetic pole center-side end of the magnet-receiving hole 22 circumferentially outward. The second magnetic flux barrier 25 extends from the magnetic pole center-side end of the magnet-receiving hole 22 radially inward. The rotor core 21 further has, for each pair of the magnet-receiving holes 22, the corresponding center bridge 26 that radially extends between the two second magnetic flux barriers 25 extending respectively from the two magnet-receiving holes 22 of the pair so as to separate the two second magnetic flux barriers 25 from each other. The rotor core 21 further has, for each of the magnet-receiving holes 22, the first and second supporting portions 27 and 29. The first supporting portion 27 supports the radially inner end portion of the first magnetic flux barrier-side face 23a of the corresponding permanent magnet 23 received in the magnet-receiving hole 22. The second supporting portion 29 protrudes from the corresponding center bridge 26 to support the second magnetic flux barrier-side face 23b of the corresponding permanent magnet 23.

With the above structure, the corresponding permanent magnet 23 is held between the first and second supporting portions 27 and 29 in the circumferential direction of the rotor core 21. Consequently, in operation, it is possible to disperse thermal stresses, which are repeatedly induced respectively in the first and second supporting portions 27 and 29 by heat generated by the corresponding permanent magnet 23, respectively toward opposite sides in the circumferential direction, thereby ensuring high strength of the rotor core 21.

Further, in the present embodiment, for each of the magnet-receiving holes 22, the second magnetic flux barrier-side end portion of the radially outer wall surface 22a of the magnet-receiving hole 22 is planar in shape and parallel to the radially outer side face 23c of the corresponding permanent magnet 23 received in the magnet-receiving hole 22. The second magnetic flux barrier-side end portion of the radially inner wall surface 22b of the magnet-receiving hole 22 is planar in shape and parallel to the radially inner side face 23d of the corresponding permanent magnet 23.

With the above configuration, it is possible to minimize both the gap between the second magnetic flux barrier-side end portion of the radially outer wall surface 22a of the magnet-receiving hole 22 and the radially outer side face 23c of the corresponding permanent magnet 23 and the gap between the second magnetic flux barrier-side end portion of the radially inner wall surface 22b of the magnet-receiving hole 22 and the radially inner side face 23d of the corresponding permanent magnet 23. Consequently, it is possible to prevent large magnetic voids from being formed on a magnetic flux loop that is created by magnetic flux leaking through the corresponding center bridge 26 and completed within the rotor 20A, thereby improving the demagnetization-suppressing performance of the rotor 20A.

In the present embodiment, for each of the magnet-receiving holes 22, the following relationship is satisfied: A>B, where A is the distance from the radially inner end of the corresponding center bridge 26 to the second supporting portion 29 and B is the distance from the radially outer end of the corresponding center bridge 26 to the second supporting portion 29.

Satisfying the above relationship, the radially inner section of the second magnetic flux barrier 25 is larger than the radially outer section, thereby enabling the second magnetic flux 25 to function better as a magnetic void space.

In the present embodiment, for each of the magnet-receiving holes 22, there is satisfied the following relationship: $\alpha<\beta$, where $\alpha$ is the acute angle formed between the centerline L1 of the second supporting portion 29 and the magnetic pole centerline C1 on the radially outside of the centerline L1, and $\beta$ is the angle formed between the imaginary line L2, which is perpendicular to the magnetization direction of the corresponding permanent magnet 23 received in the magnet-receiving hole 22, and the magnetic pole centerline C1 on the radially outside of the imaginary line L2.

Satisfying the above relationship, it is possible to increase the protruding length of the second supporting portion 29 from the corresponding center bridge 26, thereby increasing the length of the magnetic saturation loop that passes through the corresponding permanent magnet 23, the second supporting portion 29 and the corresponding center bridge 26.

In the present embodiment, for each of the magnet-receiving holes 22 of the rotor core 21, the corresponding permanent magnet 23 is fixed in the magnet-receiving hole 22 by the adhesive that is filled in the magnet-receiving hole 22 using the above-described method.

Consequently, the corresponding permanent magnet 23 is firmly fixed to the wall surfaces of the magnet-receiving hole 22, thereby ensuring high vibration resistance of the rotor 20A.

In the present embodiment, for each of the magnet-receiving holes 22 of the rotor core 21, there are formed in the rotor core 21 the pair of second magnetic flux barrier part defining surfaces 25a and 25b that each define a part of the second magnetic flux barrier 25 and are respectively adjacent to the radially inner and outer ends of the second magnetic flux barrier-side face 23b of the corresponding permanent magnet 23 received in the magnet-receiving hole 22. Further, the second magnetic flux barrier part defining surfaces 25a is configured to protrude from the second magnetic flux barrier-side face 23b of the corresponding permanent magnet 23 toward the magnetic pole centerline C1 side.

With the above configuration of the second magnetic flux barrier part defining surfaces 25a, it is possible to increase the permeance of a magnetic circuit formed in the rotor 20A.

While the above particular embodiments have been shown and described, it will be understood by those skilled in the art that various modifications, changes, and improvements may be made without departing from the spirit of the invention.

Figure 8:
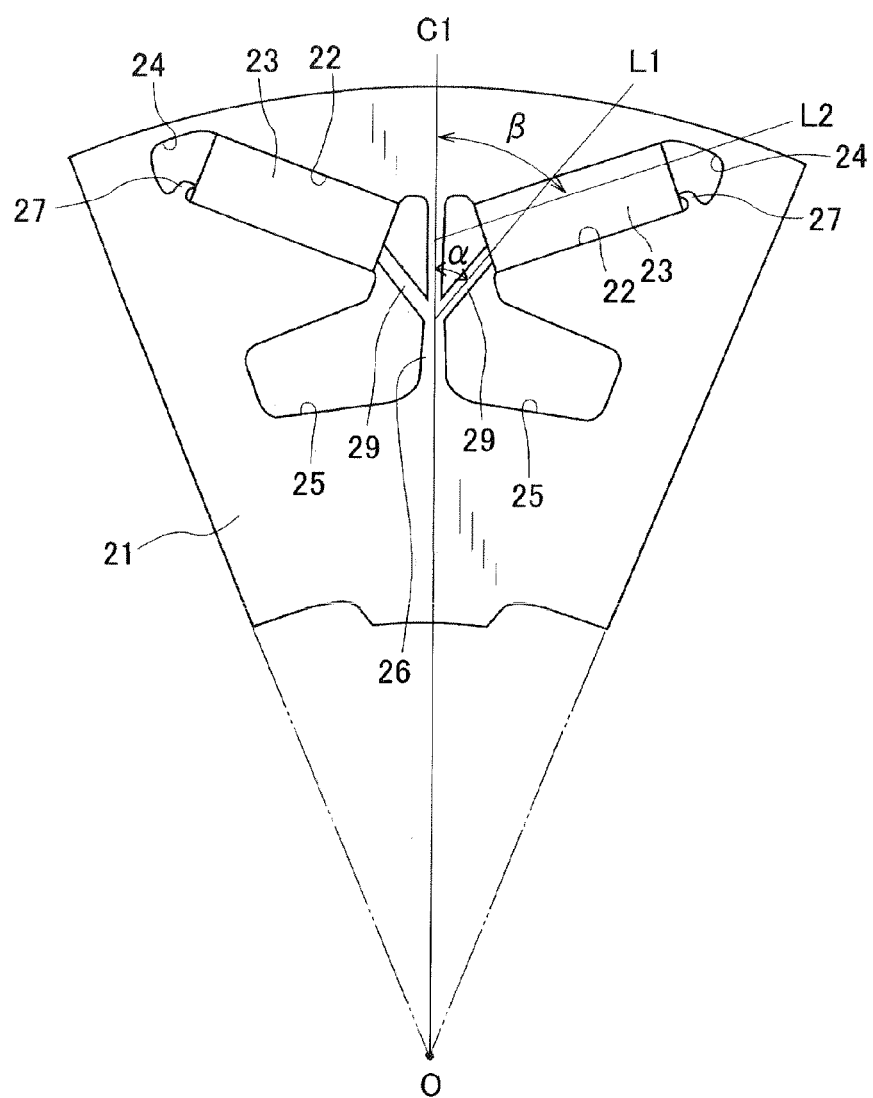
FIG. 8 is an axial view of a portion of a rotor according to one modification, the portion corresponding to one of magnetic poles that are formed in the rotor.

For example, as shown in FIG. 8, the rotor 20A according to the second embodiment may be modified so that the angle $\alpha$ between the centerline L1 of the second supporting portion 29 and the magnetic pole centerline C1 is reduced while the angle $\beta$ between the imaginary line L2 and the magnetic pole centerline C1 is unchanged.

With the above modification, it is possible to further increase the protruding length of the second supporting portion 29 from the corresponding center bridge 26, thereby further increasing the length of the magnetic saturation loop that passes through the corresponding permanent magnet 23, the second supporting portion 29 and the corresponding center bridge 26.

Moreover, in the previous embodiments, the present invention is directed to the rotor 20 or 20A of the rotating electric machine 1 that is configured as the inner rotor-type electric motor. However, the present invention can also be applied to a rotor of an electric generator or a rotor of a motor-generator that can selectively function either as an electric motor or as an electric generator.

What is claimed is:

1. A rotor for a rotating electric machine, the rotor comprising:
    a hollow cylindrical rotor core having a plurality of pairs of magnet-receiving holes formed therein, each pair of the magnet-receiving holes being arranged in a substantially V-shape that opens toward a radially outer periphery of the rotor core; and
    a plurality of permanent magnets each of which is received in a corresponding one of the magnet-receiving holes of the rotor core,
    wherein
    for each pair of the magnet-receiving holes of the rotor core, the two corresponding permanent magnets which are respectively received in the two magnet-receiving holes of the pair are arranged so as to together form one magnetic pole of the rotor, the two corresponding permanent magnets being symmetrically arranged with respect to a magnetic pole centerline C1 which extends in a radial direction of the rotor core so as to circumferentially bisect the magnetic pole formed by the two corresponding permanent magnets, the rotor core further has, for each of the magnet-receiving holes, first and second magnetic flux barriers and first and second supporting portions, the first magnetic flux barrier extending on an opposite side of the magnet-receiving hole to the magnetic pole centerline C1, circumferentially outward from the magnet-receiving hole, the second magnetic flux barrier extending on the magnetic pole centerline C1 side of the magnet-receiving hole, radially inward from the magnetic-receiving hole, the first supporting portion abutting and thereby supporting a portion of a first magnet flux barrier-side face of the corresponding permanent magnet received in the magnet-receiving hole, the portion of the first magnet flux barrier-side face being away from both radially inner and outer ends of the first magnetic flux barrier-side face and closer to the radially inner end than to the radially outer end of the first magnetic flux barrier-side face, the second supporting portion abutting and thereby supporting a portion of a second magnetic flux barrier-side face of the corresponding permanent magnet, the portion of the second magnetic flux barrier-side face being away from both radially inner and outer ends of the second magnetic flux barrier-side face and closer to the radially outer end than to the radially inner end of the second magnetic flux barrier-side face, and for each of the magnet-receiving holes, a second magnetic flux barrier-side end portion of a radially outer wall surface of the magnet-receiving hole is planar in shape and parallel to a radially outer side face of the corresponding permanent magnet received in the magnet-receiving hole, and a second magnetic flux barrier-side end portion of a radially inner wall surface of the magnet-receiving hole is planar in shape and parallel to a radially inner side face of the corresponding permanent magnet.

2. The rotor as set forth in claim 1, wherein for each of the first and second supporting portions, there is formed, in a surface of the supporting portion which faces the corresponding permanent magnet, a recess that extends in an axial direction of the rotor core and is recessed in a direction away from the corresponding permanent magnet.

3. The rotor as set forth in claim 1, wherein for each of the magnet-receiving holes of the rotor core, there are formed in the rotor core a pair of second magnetic flux barrier part defining surfaces that each define a part of the second magnetic flux barrier and are respectively adjacent to the radially inner and outer ends of the second magnetic flux barrier-side face of the corresponding permanent magnet received in the magnet-receiving hole, and at least one of the second magnetic flux barrier part defining surfaces protrudes from the second magnetic flux barrier-side face of the corresponding permanent magnet toward the magnetic pole centerline C1 side.

* * * * *